United States Patent
Kim et al.

(10) Patent No.: US 11,032,508 B2
(45) Date of Patent: Jun. 8, 2021

(54) DISPLAY APPARATUS AND METHOD FOR CONTROLLING AUDIO AND VISUAL REPRODUCTION BASED ON USER'S POSITION

(71) Applicant: SAMSUNG ELECTRONICS CO., LTD., Suwon-si (KR)

(72) Inventors: Daewung Kim, Suwon-si (KR); Euijun Kim, Suwon-si (KR); Youngah Lee, Suwon-si (KR); Donghun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/558,765

(22) Filed: Sep. 3, 2019

(65) Prior Publication Data
US 2020/0077043 A1    Mar. 5, 2020

Related U.S. Application Data

(60) Provisional application No. 62/726,552, filed on Sep. 4, 2018.

(30) Foreign Application Priority Data

Dec. 6, 2018 (KR) .......................... 10-2018-0155697

(51) Int. Cl.
*H04N 5/64* (2006.01)
*G06F 1/16* (2006.01)
*H04R 5/04* (2006.01)

(52) U.S. Cl.
CPC ........... *H04N 5/642* (2013.01); *G06F 1/1605* (2013.01); *H04R 5/04* (2013.01); *H04R 2499/15* (2013.01)

(58) Field of Classification Search
CPC ...... G06F 1/1601; G06F 1/1605; G06F 3/011; G06F 3/16; G06F 3/162; G06F 3/165;
(Continued)

(56) References Cited

U.S. PATENT DOCUMENTS 5,812,674 A * 9/1998 Jot .......................... H04S 7/305
   381/17
2006/0139314 A1 * 6/2006 Bell ...................... G06F 3/0425
   345/156
(Continued)

FOREIGN PATENT DOCUMENTS

KR     10-0838928     6/2008
KR   10-2012-0053587  5/2012
(Continued)

OTHER PUBLICATIONS

Alex Vlachos, "Water Flow in PORTAL 2", [https://steamcdn-a.akamaihd.net/apps/valve/2010/siggraph2010_vlachos_waterflow.pdf], Valve, SIGGRAPH 2010, Jul. 28, 2010, 54 pages.
(Continued)

*Primary Examiner* — Walter F Briney, III
(74) *Attorney, Agent, or Firm* — Nixon & Vanderhye P.C.

(57) ABSTRACT

A display apparatus is provided. The display apparatus according to the disclosure includes a display, a plurality of speakers, a sensor, and a processor configured to control the display apparatus to: display an image and generate a sound corresponding to the image and output the sound through the plurality of speakers, and based on a user being sensed by the sensor, determine a location of the user, and based on the determined location of the user, change a first weight of a high band sound and a second weight of a low band sound of the sound, and output the changed sounds through the plurality of speakers.

20 Claims, 23 Drawing Sheets

(58) Field of Classification Search
CPC .......... G06F 2206/20; H04S 7/00; H04S 7/30; H04S 7/301; H04S 7/302; H04S 7/303; H04S 7/307; H04S 7/40; H04S 2400/00; H04S 2400/13; A63F 13/27
See application file for complete search history.

(56) References Cited

U.S. PATENT DOCUMENTS

| | | |
|---|---|---|
| 2008/0266286 A1 | 10/2008 | Ramey et al. |
| 2011/0274278 A1* | 11/2011 | Kim .................... H04S 5/00 381/17 |
| 2012/0128184 A1 | 5/2012 | Kim et al. |
| 2012/0293405 A1* | 11/2012 | Iida .................... G06F 3/011 345/156 |
| 2014/0221090 A1* | 8/2014 | Mutschler ............... A63F 13/12 463/31 |
| 2015/0058812 A1* | 2/2015 | Lindh .................. G06F 3/012 715/863 |
| 2015/0097862 A1* | 4/2015 | Reisner-Kollmann ........ G06T 19/20 345/633 |
| 2016/0259403 A1* | 9/2016 | Wang .................... G06F 3/1415 |
| 2017/0001561 A1* | 1/2017 | Christoph ............. G10K 15/12 |
| 2017/0333799 A1 | 11/2017 | Park |
| 2018/0014135 A1 | 1/2018 | Chung et al. |
| 2018/0288556 A1 | 10/2018 | Kyung |
| 2019/0303722 A1* | 10/2019 | Linden ................. G06K 9/0061 |

FOREIGN PATENT DOCUMENTS

| | | |
|---|---|---|
| KR | 10-1691234 | 12/2016 |
| KR | 10-1851360 | 4/2018 |
| WO | 2006/073990 | 7/2006 |
| WO | 2015/196124 | 12/2015 |
| WO | 2016-080568 | 5/2016 |
| WO | 2017/057866 | 4/2017 |
| WO | 2018/012746 | 1/2018 |

OTHER PUBLICATIONS

International Search Report and Written Opinion dated Dec. 23, 2019 in counterpart International Application No. PCT/KR2019/011376.

* cited by examiner

DISPLAY APPARATUS AND METHOD FOR CONTROLLING AUDIO AND VISUAL REPRODUCTION BASED ON USER'S POSITION

CROSS-REFERENCE TO RELATED APPLICATIONS

This application is based on and claims priority under 35 U.S.C. § 119 to Korean patent application number 10-2018-0155697, filed on Dec. 6, 2018, in the Korean Intellectual Property Office, and U.S. provisional patent application No. 62/726,552 filed on Sep. 4, 2018 in the United States Patent and Trademark Office, the disclosures of which are incorporated by reference herein in their entireties.

BACKGROUND

1. Field

The disclosure relates to a display apparatus and a control method thereof, and for example, to a display apparatus which provides different images and audio according to the locations of a user, and a control method thereof.

2. Description of Related Art

Spurred by the development of electronic technologies, various types of electronic products are being developed and distributed. In particular, contents that are specially manufactured by visualizing natural phenomena such as a waterfall and wind to be suited to a large-size display apparatus installed on a wall are being used a lot.

In the conventional technology, for manufacturing such contents, methods such as repetitively reproducing a video that photographed an actual natural phenomenon, performing real time rendering through fluid simulation, or performing real time rendering using a scrolling method were used.

However, in such methods, there were problems that excessive resources are required, and as a video is repetitively reproduced, a user feels fatigue, and a sense of realism deteriorates.

SUMMARY

Various embodiments of the disclosure address the aforementioned problems, and provide a display apparatus which provides different images and audio based on the locations of a user, and a control method thereof.

A display apparatus according to an example embodiment of the disclosure includes a display, a plurality of speakers, a sensor, and a processor configured to control the display apparatus to: display an image and generate a sound corresponding to the image and output the sound through the plurality of speakers, and determine a location of a user based on the user being sensed by the sensor, and change a first weight of a high band sound and a second weight of a low band sound of the sound based on the determined location of the user, and output the changed sounds through the plurality of speakers.

The sound may be generated by merging the high band sound and the low band sound.

The processor may, based on the determined location of the user being more to the center of the display, decrease the first weight of the high band sound, and increase the second weight of the low band sound.

The processor may, based on a distance between the determined location of the user and the display increasing, increase the first weight of the high band sound, and decrease the second weight of the low band sound.

The processor may control the display apparatus to provide an image effect to an area corresponding to the determined location of the user in the image.

The processor may control the display apparatus to adjust panning of the high band sound based on the determined location of the user, and output the low band sound and the adjusted high band sound through the plurality of speakers.

The plurality of speakers may include a left side speaker and a right side speaker, and the processor may, based on the determined location of the user being a side of the display, control the display apparatus to output a sound having a phase different from the phase of a sound output through the left side speaker through the right side speaker.

The display apparatus according to an example embodiment of the disclosure may further include a communicator comprising communication circuitry, and the processor may receive weather information through the communicator, and during a time period including rain information, the processor may control the display apparatus to: increase the second weight of the low band sound, distribute the low band sound, and output the sound through the plurality of speakers.

The processor may, based on a distance between the determined location of the user and the display increasing, control the display apparatus to output a sound having an increased volume through the plurality of speakers.

The plurality of speakers may include a left side speaker and a right side speaker, and the processor may, based on the determined location of the user moving inside the area of the display, control the display apparatus to adjust the volumes of the left side speaker and the right side speaker based on the movement of the location.

The processor may divide the display into a plurality of vertical areas, and determine a location of a user based on an area wherein a user was sensed by the sensor among the plurality of vertical areas and a distance between the display and the user.

The processor may, based on a user sensed by the sensor not existing, apply low frequency oscillator (LFO) signals of a random cycle to each of a high band sound and a low band sound of a sound corresponding to the image and control the display apparatus to output the sounds through the plurality of speakers.

The display apparatus according to an example embodiment of the disclosure may further include a communicator comprising communication circuitry, and the image may be an image related to a waterfall, and the processor may, based on weather information being received through the communicator, control the display apparatus to apply a prism effect or an illumination effect based on the weather information and time information.

The image may be an image related to a waterfall, and the processor may, based on the determined location of the user being maintained during a predetermined time period, control the display apparatus to increase an image effect that a width of a waterfall stream in the area of the display corresponding to the location of the user.

The image may be an image related to a waterfall, and the processor may control the display apparatus to adjust an amount of a fog displayed in a lower end area of the display based on the width of the waterfall stream.

A method of controlling a display apparatus according to an example embodiment of the disclosure includes: displaying an image, generating a sound corresponding to the image and outputting the sound through a plurality of speakers, and determining a location of a user based on the user being sensed, and changing a first weight of a high band sound and a second weight of a low band sound of the sound based on the determined location of the user, and outputting the changed sounds through the plurality of speakers.

In changing, based on the determined location of the user being more to the center of the display, the first weight of the high band sound may be decreased, and the second weight of the low band sound may be increased.

In changing, based on a distance between the determined location of the user and the display increasing, the first weight of the high band sound may be increased, and the second weight of the low band sound may be decreased.

The plurality of speakers may include a left side speaker and a right side speaker, and in outputting, based on the determined location of the user being a side of the display, a sound having a phase different from the phase of a sound output through the left side speaker may be output through the right side speaker.

In the outputting, based on a user sensed not existing, low frequency oscillator (LFO) signals of a random cycle may be applied to each of a high band sound and a low band sound of a sound corresponding to the image and the sounds may be output through the plurality of speakers.

BRIEF DESCRIPTION OF THE DRAWINGS

The above and/or other aspects, features and advantages of certain embodiments of the present disclosure will be more apparent from the following detailed description, taken in conjunction with the accompanying drawings, in which.

DETAILED DESCRIPTION

Figure 1:
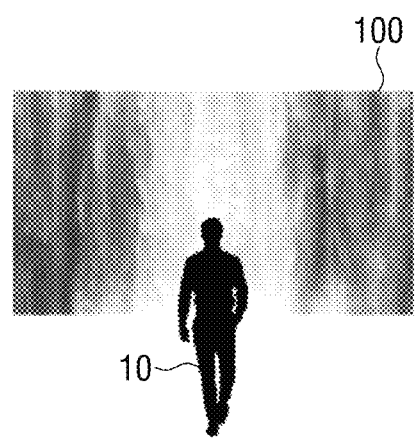
FIG. 1 is a diagram illustrating an example of usage of a display apparatus according to the disclosure.

Hereinafter, the terms used in this disclosure will be described briefly, and then the disclosure will be described in greater detail with reference to the drawings.

As terms used in the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there may be terms may be arbitrarily selected, and in such cases, the meaning of the terms will be apparent from the relevant descriptions in the disclosure. Thus, the terms used in the disclosure should be defined based on the meaning of the terms and the overall content of the disclosure, but not just based on the names of the terms.

Also, various modifications may be made to the various example embodiments of the disclosure. Accordingly, specific embodiments will be illustrated in drawings, and the embodiments will be described in the disclosure. However, it should be noted that the various example embodiments do not limit the scope of the disclosure to any specific embodiment, but they should be interpreted to include all modifications, equivalents or alternatives of the embodiments included in the idea and the technical scope disclosed herein.

Meanwhile, in case it is determined that in describing embodiments, detailed explanation of related known technologies may unnecessarily confuse the gist of the disclosure, a detailed explanation thereof may be omitted.

In addition, terms such as "first," "second" and the like may be used to describe various elements, but the terms are not intended to limit the elements. Such terms are used simply to distinguish one element from another element.

Further, singular expressions also include plural expressions as long as they do not conflict with the context. In the disclosure, terms such as "include" and "have/has" should be understood as designating that there are such characteristics, numbers, steps, operations, elements, components or a combination thereof described in the disclosure, but not to exclude the existence or possibility of adding one or more of other characteristics, numbers, steps, operations, elements, components or a combination thereof.

In the embodiments of the disclosure, the terms "a module" or "a part" may refer, for example, to elements performing at least one function or operation, and these elements may be implemented as hardware or software, or as a combination of hardware and software. Further, a plurality of "modules" or a plurality of "parts" may be integrated into at least one module and implemented as at least one processor, except "a module" or "a part" that needs to be implemented as specific hardware.

Hereinafter, various example embodiments of the disclosure will be described in greater detail with reference to the accompanying drawings. However, it should be noted that the disclosure may be implemented in various different forms, and is not limited to the embodiments described herein. Also, in the drawings, parts that are not related to explanation may be omitted, for explaining the disclosure more clearly, and throughout the disclosure, similar components may be designated by similar reference numerals.

Hereinafter, the disclosure will be described in greater detail with reference to the drawings.

FIG. 1 is a diagram illustrating an example of usage of a display apparatus according to an embodiment of the disclosure.

Referring to FIG. 1, the display apparatus 100 may display a background image. The display apparatus 100 may, for example, and without limitation, be a TV, a monitor, a laptop PC, an electronic photo frame, a kiosk, an electronic display board, a multi display including a plurality of displays, etc. The display apparatus 100 may, for example, be a display apparatus of which main body stands on a floor, or which is installed on a wall.

There may be one or more users 10, and they may be located in front of the display apparatus 100. When the user 10 is sensed, the display apparatus 100 may change an image effect and a sound based on the location of the user 10, and output the sound. Detailed operations of the display apparatus 100 will be described in greater detail below with reference to FIGS. 2 to 23.

Figure 2:
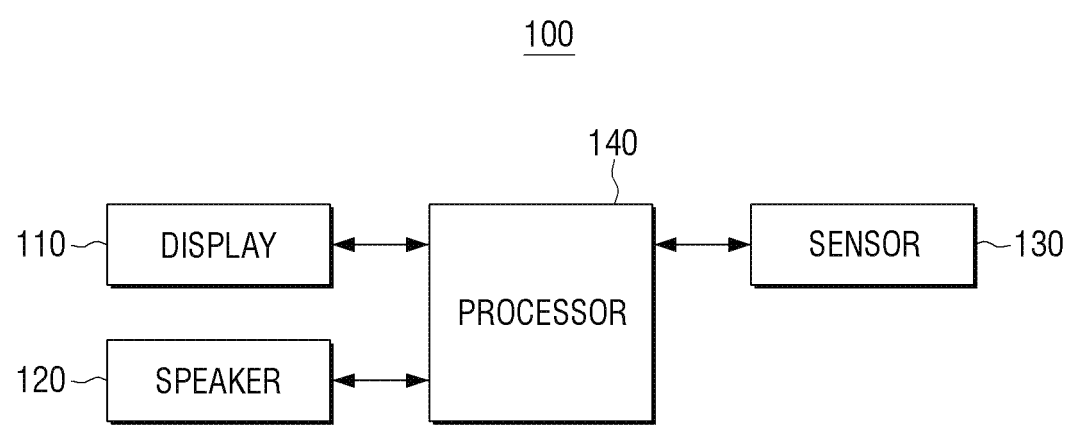
FIG. 2 is a block diagram illustrating an example configuration of a display apparatus according to an embodiment of the disclosure.

FIG. 2 is a block diagram illustrating an example configuration of a display apparatus according to an embodiment of the disclosure.

Referring to FIG. 2, the display apparatus 100 includes a display 110, a speaker 120, a sensor 130, and a processor (e.g., including processing circuitry) 140.

The display 110 may display an image under control of the processor 140. Hereinafter, for the convenience of explanation, an image displayed on the display 110 may be referred to as 'a background image.' A background image may be a nature background image such as, for example, and without limitation, a waterfall, a cloud, a tree, an artificial background image (e.g., a fountain), or the like. The display 110 may display an image wherein various image effects were added to a background image under control of the processor 140. Such image effects will be described in greater detail below with reference to FIGS. 18 to 21.

The display 110 may be implemented as various types of displays such as, for example, and without limitation, a liquid crystal display (LCD), an organic light emitting diode (OLED) display, a plasma display panel (PDP), or the like. In the display 110, driving circuits that may be implemented in forms such as, for example, and without limitation, an a-si TFT, a low temperature poly silicon (LTPS) TFT, an organic TFT (OTFT), a backlight unit, etc. may also be included together. The display 110 may also be implemented as a touch screen, a flexible display, a transparent display, or the like.

The speaker 120 may output a sound. For example, the speaker 120 may output a sound corresponding to an image displayed on the display 110. Also, based on whether a user is sensed, the speaker 120 may output a sound changed under control of the processor 140.

The speaker 120 may be provided on the display apparatus 100, or it may be an external apparatus connected with the display apparatus 100 by wire/wirelessly. Depending on embodiments, some of a plurality of speakers may be provided on the display apparatus 100, and the remaining speakers may be external apparatuses connected with the display apparatus 100 by wire/wirelessly.

For example, if there are a plurality of speakers 120, the speakers 120 may include a left side speaker disposed on the left side of the display 110, and a right side speaker disposed on the right side of the display 110, based on the user 10 gazing the display 110. A left side speaker and a right side speaker may be referred to differently depending on standards.

The plurality of speakers may respectively output different sounds under control of the processor 140. Various examples of outputting of a sound will be described in greater detail below with reference to FIGS. 11 to 18.

The sensor 130 is a component for sensing a user and may include, for example, and without limitation a sensor and/or sensing circuitry. For example, and without limitation, the sensor 130 may sense at least one of whether a user exists, a location of a user, or a distance from the display 110 using at least one sensor.

The sensor 130 may, for example, be a motion sensor sensing whether a user exists and movements of a user. For example, a motion sensor may be an RGB camera, a depth camera, an infrared sensor, an ultrasonic sensor, any combination thereof, etc.

The processor 140 may include various processing circuitry and controls the overall operations of the display apparatus 100.

According to an embodiment of the disclosure, the processor 140 may include various processing circuitry, such as, for example, and without limitation, a digital signal processor (DSP), a microprocessor, a time controller (TCON), or the like. However, the processor 140 is not limited thereto, and it may include various processing circuitry, such as, for example, and without limitation, one or more of a central processing unit (CPU), a micro controller unit (MCU), a micro processing unit (MPU), a controller, an application processor (AP) or a communication processor (CP), an ARM processor, or the like. The processor 140 may be implemented as a system on chip (SoC) having a processing algorithm stored therein or large scale integration (LSI), or in the form of a field programmable gate array (FPGA).

Also, the processor 140 may control the display 110 to display a background image, and control the speaker 120 to output a sound corresponding to the background image.

When a user is sensed by the sensor 130, the processor 140 may determine the location of the user based on a sensing value received from the sensor 130. For example, the processor 140 may divide the display 110 into a plurality of vertical areas, and determine that the user is located in an area wherein the user is projected among the plurality of divided areas. The processor 140 may identify the distance between the user and the display 110 based on the sensing value, and determine the ultimate location of the user. Such an operation of determining a location of a user will be described in greater detail below with reference to FIGS. 4 and 5.

In addition, the processor 140 may change a sound based on the determined location of the user, and control the speaker 120 to output the changed sound. For example, the processor 140 may divide a sound corresponding to the background image into a high band sound and a low band sound. The processor 140 may change the weights of the high band sound and the low band sound based on the determined location of the user. The processor 140 may merge the high band sound of which weight has been changed and the low band sound of which weight has been changed and generate a sound, and output the generated sound through the speaker 120.

For example, as the determined location of the user is closer to the center of the display 110, the processor 140 may decrease the weight of the high band sound, and increase the weight of the low band sound. Change of a sound according to a location of a user at the display 110 will be described in greater detail below with reference to FIGS. 8 and 11.

The processor 140 may change a sound based on a distance between a user and the display 110. For example, as the distance between the determined location of the user and the display 110 increases, the processor 140 may increase the weight of the high band sound, and decrease the weight of the low band sound. Change of a sound according to a distance between the display 110 and a user will be described in greater detail below with reference to FIGS. 8 and 12.

Changing the sound is for raising low frequency energy as a user becomes closer to the center of a waterfall or wind, and as the user's distance becomes closer to a waterfall or wind, and giving the user a feeling of actually getting closer to a waterfall or wind.

The processor 140 may adjust panning of a sound based on a determined location of a user. Panning may refer, for example, to adjusting a direction of a sound. For example, the processor 140 may divide a sound into a high band sound and a low band sound, and adjust panning of the divided high band sound based on a location of a user. The processor 140 may merge the divided low band sound and the high band sound of which panning has been adjusted, and output the sound through the speaker 120. By making the low band sound wherein there is no directivity in the sound pass as it is, and adjusting panning of only the high band sound having directivity according to the location of the user, the energy in the low band may be maintained and the grandiosity of the sound may be maintained, and the sound may be output to match the direction of the user. Adjustment of panning of a sound according to a location of a user will be described in greater detail below with reference to FIG. 8.

As the determined location of the user becomes closer to a side area of the display 110, the processor 140 may output sounds such that the phase of a sound output from the left side speaker is different from the phase of a sound output from the right side speaker. For example, the time phase of a sound output from the left side speaker may be different from the time phase of a sound output from the right side speaker. For example, in case a user is located on a side of the display 110, the processor 140 may output sounds such that the phase of the left side speaker and the phase of the right side speaker are different as much as 14 ms. By virtue of this, the user may feel a more enlarged sense of space. An embodiment wherein phases of a left side speaker and a right side speaker are output differently according to a location of a user will be described in greater detail below with reference to FIG. 16.

Further, if two or more users are sensed by the sensor 130, the processor 140 may output the phases of the left side speaker and the right side speaker differently, and thereby make the users feel a more enlarged sense of space. An embodiment wherein phases of a left side speaker and a right side speaker are output differently according to the number of sensed users will be described in greater detail below with reference to FIG. 17.

The processor 140 may output a sound by adjusting the volume of the speaker 120 based on a determined location of a user. For example, as the distance between a user and the display 110 increases, the processor 140 may output a sound of which volume has been increased through the speaker 120. By virtue of this, the user may hear a sound having the same volume within a specific range of distance of the display 110.

If a location of a user moves inside the area of the display 110, the processor 140 may adjust the volumes of the left side speaker and the right side speaker based on movement of the location. The processor 140 may add an image effect according to the movement speed of the user to a background image displayed on the display 110.

For example, if the movement speed of the user is fast, the processor 140 may add an image effect that wind blows to a background image displayed on the display 110, and increase the volume of the wind sound, and output the sound. For example, in a state wherein a tree is displayed as a background image, if the movement speed of the user is fast, the processor 140 may display an image effect that the tree sways in the wind based on the speed of the user. The processor 140 may display an image effect that the shadow sways based on the movement speed of the user. An image effect and outputting of a sound according to a movement speed of a user as above will be described in greater detail below with reference to FIG. 18.

The processor 140 may provide an image effect to an area corresponding to a determined location of a user in a background image displayed on the display 110. For example, if a background image is an image related to a waterfall, and a location of a user determined by the sensor 130 is maintained during a predetermined time period, the processor 140 may control the display 110 to provide an image effect that a width of a waterfall stream in the area corresponding to the location of the user in the waterfall image is increased.

The processor 140 may adjust an amount of a fog displayed in a lower end area of the display 110 based on the width of the image related to the waterfall. For example, if the width of the waterfall increases, the processor 140 may increase the amount of a fog displayed in a lower end area of the display 110.

If the width of the waterfall stream in the area corresponding to the location of the user is increased, the processor 140 may output a waterfall sound wherein the weight of the low band has been increased based on the width of the waterfall stream through the speaker 120.

As another example, if a background image is an image related to a cloud (or a tree), and a location of a user determined by the sensor 130 is maintained during a predetermined time period, the processor 140 may control the display 110 to provide an image effect of increasing the movement speed of the cloud image.

The processor 140 may output a wind sound wherein the weight of the low band has been increased based on the movement speed of the cloud through the speaker 120.

If there is no user sensed by the sensor 130, the processor 140 may apply low frequency oscillators (LFOs) of a random cycle to each of a high band sound and a low band sound of a sound corresponding to the background image and output the sounds through the speaker 120. This will be described in greater detail below with reference to FIG. 9.

While it is illustrated in FIG. 2 that the display 110 is an essential component, depending on embodiments, the display 110 may be implemented as being connected with an external display apparatus, instead of being provided on the display apparatus 100.

As described above, an image effect and a sound are provided based on a location of a user, and accordingly, a user may feel a sense of realism which is more similar to reality.

Figure 3:
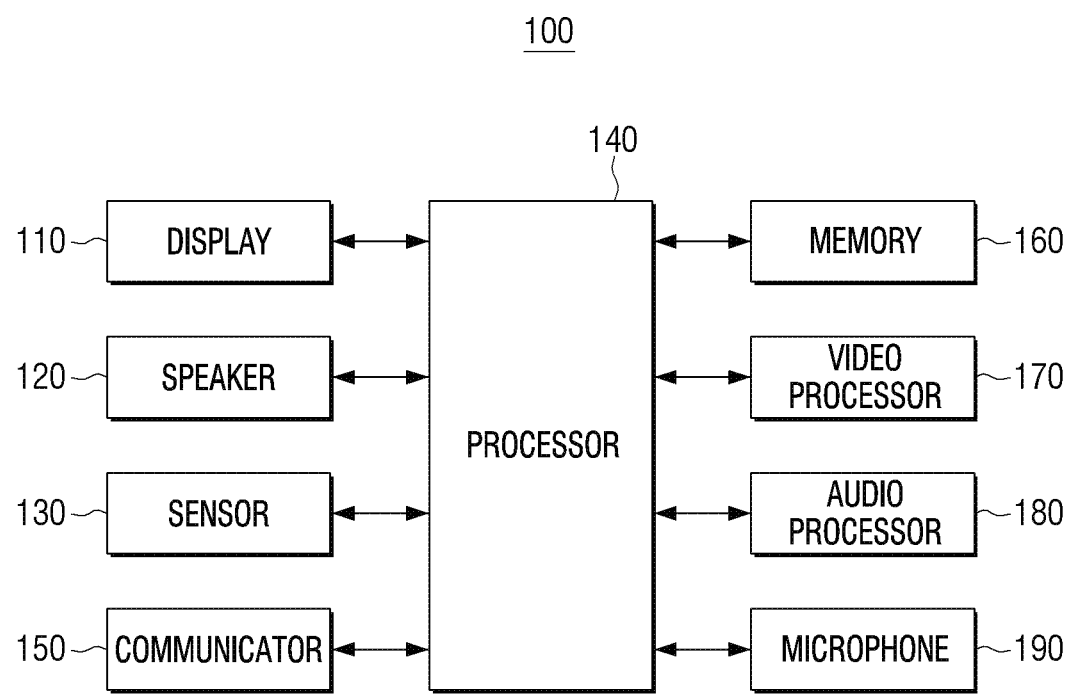
FIG. 3 is a block diagram illustrating an example configuration of the display apparatus disclosed in FIG. 2 according to an embodiment of the disclosure.

FIG. 3 is a block diagram illustrating an example configuration of the display apparatus disclosed in FIG. 2 according to an embodiment of the disclosure.

Referring to FIG. 3, the display apparatus 100 may include a display 110, a speaker 120, a sensor 130, a processor (e.g., including processing circuitry) 140, a communicator (e.g., including communication circuitry) 150, a memory 160, a video processor (e.g., including video processing circuitry) 170, an audio processor (e.g., including audio processing circuitry) 180, and a microphone 190.

As the display 110, the speaker 120, and the sensor 130 are the same as or similar to the components illustrated in FIG. 2, overlapping descriptions will not be repeated here.

The communicator 150 may include various communication circuitry, and the communicator 150 may perform communication with various types of external apparatuses according to various types of communication methods. External apparatuses communicating with the display apparatus 100 may, for example, be a server or a user terminal apparatus, and the like.

Connection of communication between the communicator 150 and external apparatuses may include communication through a third device (e.g., a repeater, a hub, an access point, a server, or a gateway, etc.). Wireless communication may include, for example, cellular communication using, for example, and without limitation, at least one of LTE, LTE Advance (LTE-A), code division multiple access (CDMA), wideband CDMA (WCDMA), a universal mobile telecommunications system (UMTS), Wireless Broadband (WiBro), a Global System for Mobile Communications (GSM), or the like. According to an embodiment, wireless communication may include, for example, and without limitation, at least one of wireless fidelity (WiFi), Bluetooth, Bluetooth low energy (BLE), Zigbee, near field communication (NFC), Magnetic Secure Transmission, radio frequency (RF), a body area network (BAN), or the like. Wired communication may include, for example, and without limitation, at least one of a universal serial bus (USB), a high definition multimedia interface (HDMI), a recommended standard232 (RS-232), power line communication, a plain old telephone service (POTS), or the like. Networks wherein wireless communication or wired communication is performed may include, for example, and without limitation, at least one of a telecommunication network, for example, a computer network (e.g., an LAN or a WAN), Internet, a telephone network, or the like.

The communicator 150 may receive weather information, time information, etc. from an external apparatus.

Using at least one of the weather information or the time information received through the communicator 150, the processor 140 may provide an image effect to a background image displayed on the display 110, change a sound, and output the sound.

Figure 10:
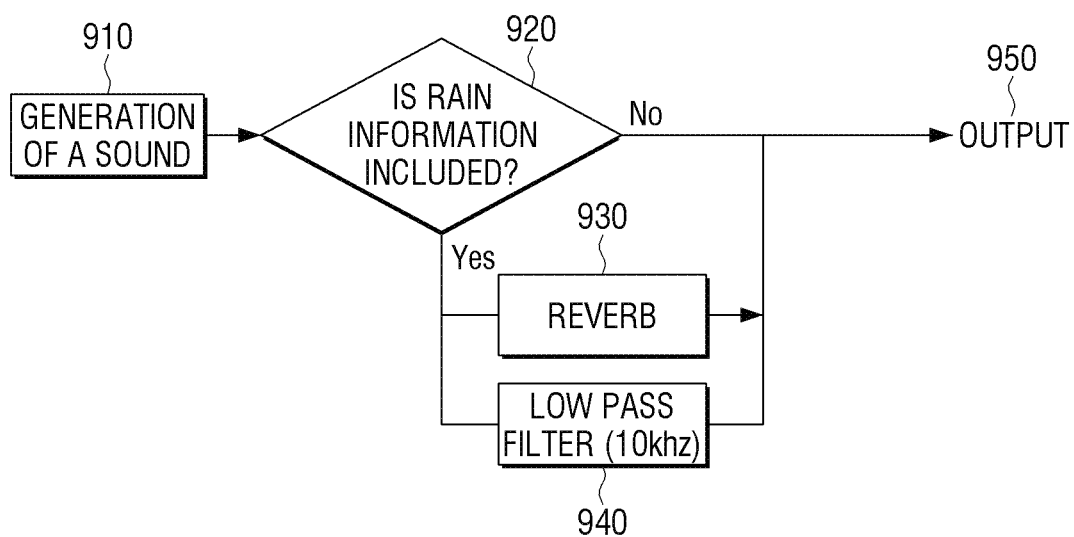
FIG. 10 is a flowchart illustrating an example process of changing a sound based on weather information according to an embodiment of the disclosure.

For example, if rain information is included in the weather information, the processor 140 may increase the weight of the low band sound during a time period including rain information as illustrated in FIG. 10, distribute the low band sound, and output the sound through the speaker 120.

Referring to FIG. 10, the processor 140 may generate a sound corresponding to a background image displayed on the display 110 in operation 910. The processor 140 may determine whether rain information is included in the weather information received through the communicator 150 in operation 920, and if rain information is included 920-Y, the processor 140 may suppress a high band sound of a sound of a time period including rain information using a low pass filter 940, distribute the sound through a reverb 930, and output the sound 950. In FIG. 10, for the convenience of explanation, it was illustrated that the reverb 930 and the low pass filter 940 are applied in parallel, but in actual implementation, they may be applied consecutively, or only one of the two may be applied.

If rain information is not included 920-N, the processor 140 may output the generated sound 910 as it is.

As an example, if at least one of weather information or time information is received through the communicator 150, the processor 140 may provide an image effect using at least one of the received weather information or time information.

Figure 20:
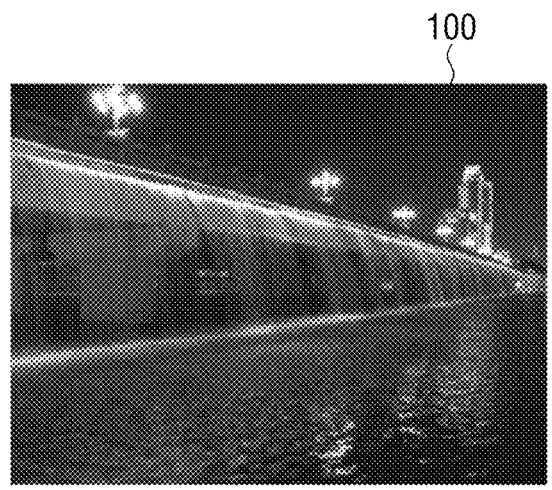
FIG. 20 is a diagram illustrating an example image effect based on time information according to an embodiment of the disclosure.

For example, based on the received time information, if the current time is night, the processor 140 may control the display apparatus 100 such that an illumination effect is displayed, as illustrated in FIG. 20.

Figure 21:
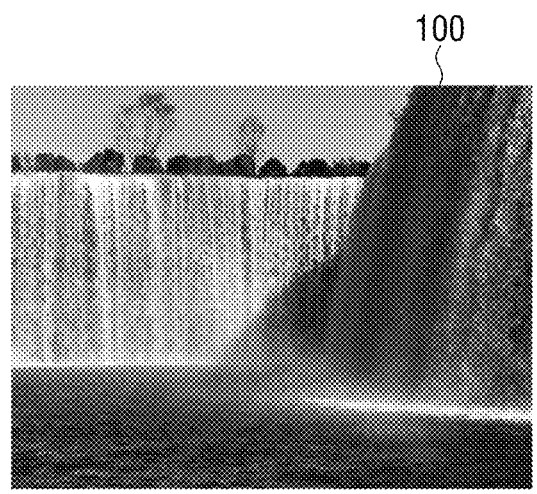
FIG. 21 is a diagram illustrating an example image effect based on weather information according to an embodiment of the disclosure.

If a background image displayed on the display 110 is an image related to a waterfall, in case the current time is a day and the weather is fine, based on the received time information and weather information, the processor 140 may control the display apparatus 100 such that a prism effect is displayed, as illustrated in FIG. 21.

The memory 160 may store various types of programs and data necessary for the operations of the display apparatus 100. For example, in the memory 160, at least one instruction may be stored. The processor 140 may perform the aforementioned operations by executing the instructions stored in the memory 160. The memory 160 may be implemented as, for example, and without limitation, a nonvolatile memory, a volatile memory, a flash-memory, a hard disc drive (HDD), a solid state drive (SSD), etc.

For example, in the memory 160, for providing a sense of realism to a user, information on the volume, panning, weight, etc. of a sound according to a location of a user may be matched and stored. The memory 160, may store an image effect according to weather information or time information may be matched and stored.

In the memory 160, a content for a background image may be stored. Here, a background image may be a nature background image such as a waterfall, a tree, and a cloud, or an artificial background image such as a fountain.

The video processor 170 may include various video processing circuitry for processing a content received through the communicator 150, or video data included in a content stored in the memory 160. The video processor 170 may perform various types of image processing such as, for example, and without limitation, decoding, scaling, noise filtering, frame rate conversion, resolution conversion of video data, or the like.

The audio processor 180 may include various audio processing circuitry for processing a content received through the communicator 150, or audio data included in a content stored in the memory 160. The audio processor 180 may perform various types of processing such as, for example, and without limitation, decoding, amplification, noise filtering, or the like, of audio data.

The processor 140 may operate the video processor 170 and the audio processor 180 when a reproduction application for a multimedia content is executed, and may thereby reproduce the content. The display 110 may display an image frame generated at the video processor 170 in at least one area between a main display area and a sub display area.

The microphone 190 may receive an uttered user voice. The microphone 190 may generate (or, convert) a voice or a sound received from the outside into an electronic signal by control of the processor 140. An electronic signal generated at the microphone 190 may be converted by control of the processor 140 and be stored in the memory 160.

Figure 22:
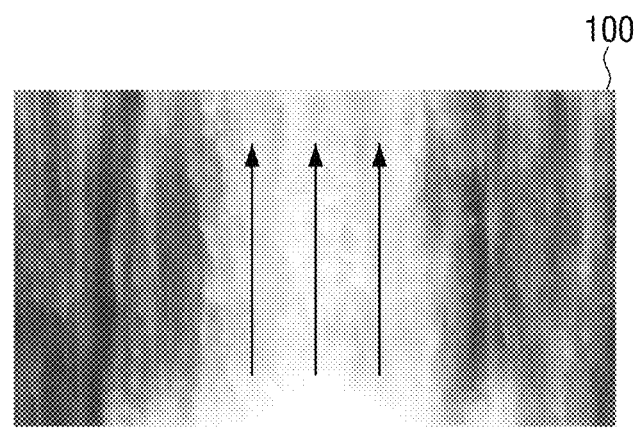
FIG. 22 is a diagram illustrating an example image effect based on input of a user instruction according to an embodiment of the disclosure.

As an example, if a user motion is sensed through the sensor 130, or a user voice including a triggering word is received through the microphone 190, the processor 140 may provide an image effect such that a waterfall goes backward to the upside while a user instruction is being input, as illustrated in FIG. 22. If a user instruction is input again, or input of a user instruction ends, the processor 140 may display the background image such that the waterfall falls to the downside again. Such an operation may be provided as an image effect of changing the direction of wind in case a background image is a cloud or a tree.

Other than the above, although not illustrated in FIG. 3, depending on embodiments, it may be apparent that inside the display apparatus 100, a USB port to which a USB connector can be connected, an HDMI port, various external input ports for connecting to various external terminals such as a headset, a mouse, and an LAN, a DMB chip that receives a digital multimedia broadcasting (DMB) signal and processes the signal, various sensors, etc. can be further included.

Figure 4:
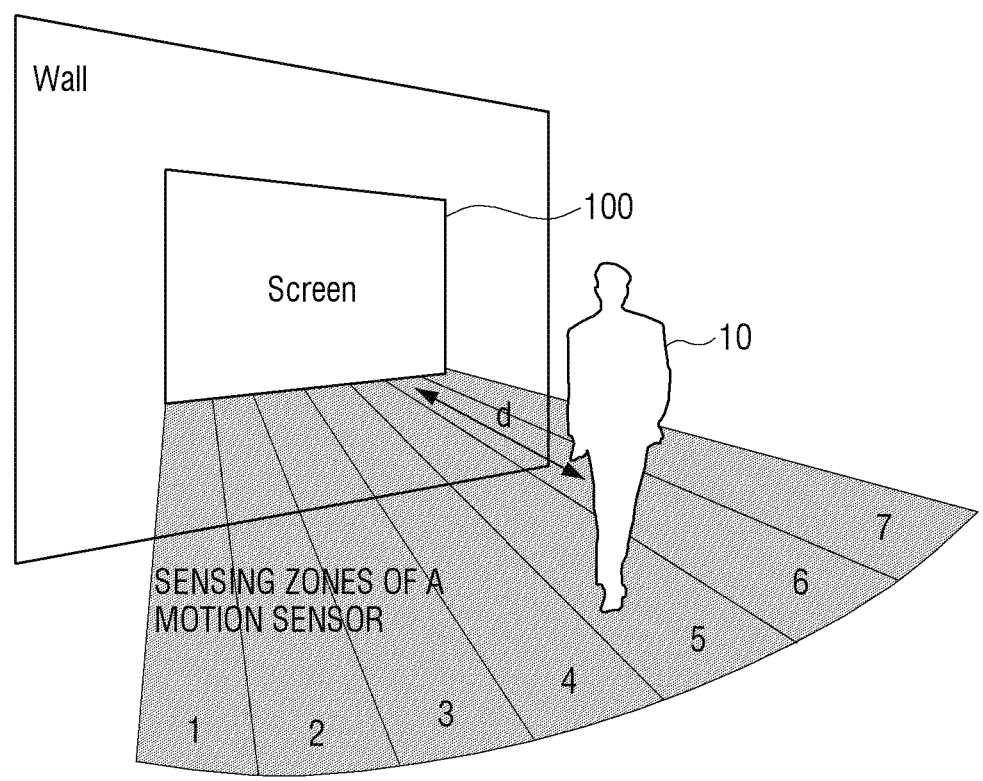
FIG. 4 is a diagram illustrating an example of determining a location of a user according to an embodiment of the disclosure.
Figure 5:
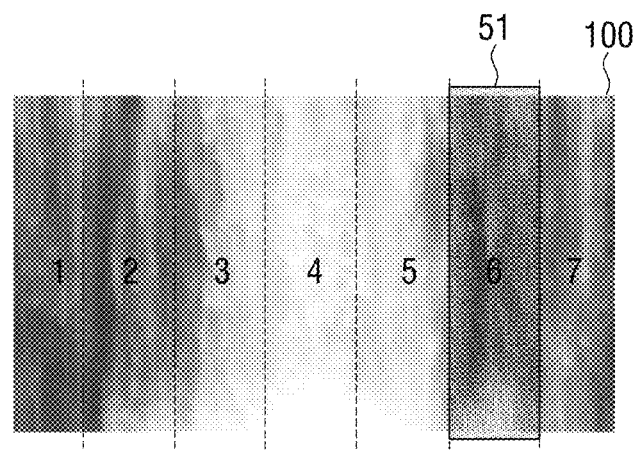
FIG. 5 is a diagram illustrating an example of determining a location of a user according to an embodiment of the disclosure.

FIGS. 4 and 5 are diagrams illustrating examples of determining a location of a user according to an embodiment of the disclosure.

Referring to FIG. 4, the display apparatus 100 installed on a wall may determine a location of a user 10 using an area wherein the user 10 was sensed by means of a sensor and a distance d between the display and the user 10. The user 10 may be located within a distance and a width that the sensor can sense.

As an example, the display apparatus 100 may divide the display into a plurality of vertical areas, as illustrated in FIG. 5, and sense an area wherein a user is projected among the plurality of vertical areas. Referring to FIGS. 4 and 5, among the plurality of vertical areas 1, 2, 3, 4, 5, 6 and 7 (which may be referred to hereinafter as areas from 1 to 7), the area wherein the user was sensed may be the area 6, and thus the display apparatus 100 may determine that the user 10 is located in a location which is within the area 6 (51), and of which distance is d.

Meanwhile, FIGS. 4 and 5 are merely an example of determining a location of a user, and a location of a user may be determined by various methods such as, for example, and without limitation, determining a location of a user using a plurality of ultrasonic sensors, a plurality of infrared sensors, determining a location of a user using a camera, etc.

FIGS. 6 and 7A, 7B and 7C are diagrams illustrating an example method of expressing an image of a waterfall according to an embodiment of the disclosure.

In the conventional technology, a graphic as if water flowed was rendered by repeating a flow map wherein a flow of water (a directional vector) was mapped to an RGB color space and a normal map for calculating refraction of the surface of water. Here, a normal map may mean a technology of enhancing operation efficiency by performing detailed description such as a shadow using a texture.

Figure 6:
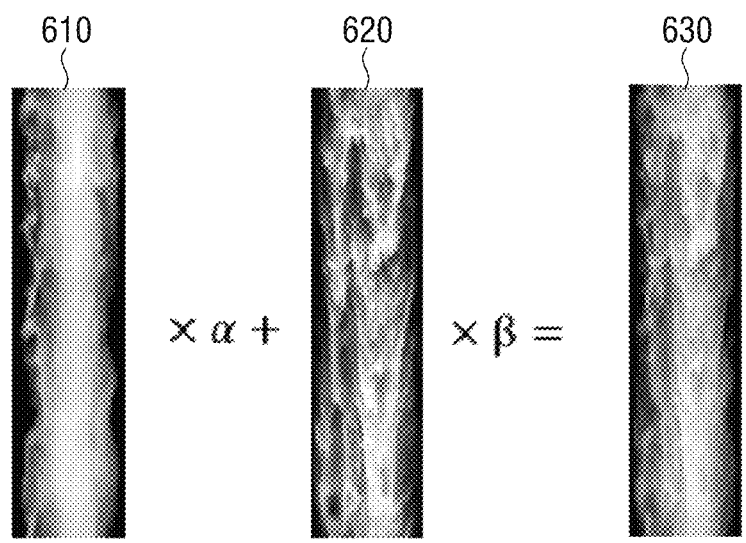
FIG. 6 is a diagram illustrating an example method of expressing an image of a waterfall according to an embodiment of the disclosure.

Meanwhile, in the disclosure, a waterfall may be rendered using a waterfall texture instead of using a normal map. For example, a display apparatus may mix two or more textures using random elements, to avoid a feeling that textures of a waterfall are repeated. In FIG. 6, an embodiment of mixing two textures was illustrated, but in actual implementation, three or more textures may be mixed.

Referring to FIG. 6, a display apparatus may acquire an output texture 630 by summing up a texture A 610 to which a weight α was multiplied, and a texture B 620 to which a weight β was multiplied. Here, α+β satisfies 1.0, and at least one of α or β may have been generated, for example, by a perlin noise algorithm. Here, a perlin noise algorithm is a technology used for generating a natural texture on a surface in the field of graphics, and it enables better expression of the complexity of natural phenomena in visual effects.

As an example, two or more textures mixed may be selected from texture groups classified based on the amounts of water, and a texture selected in a texture group may be changed by a random cycle. For example, texture groups classified based on the amounts of water of waterfalls may have been stored in a display apparatus in advance, or may have been received from an external apparatus.

Figure 7A:
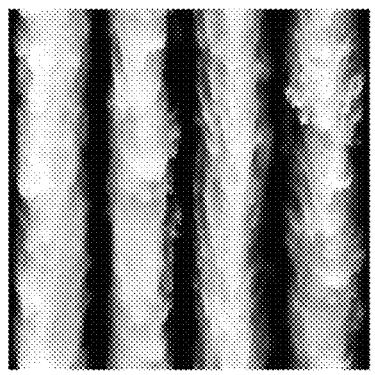
FIGS. 7A, 7B and 7C are diagrams illustrating an example method of expressing an image of a waterfall according to an embodiment of the disclosure.
Figure 7B:
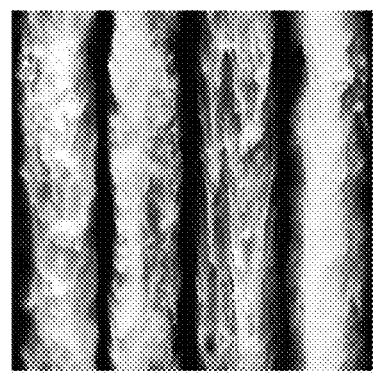
Figure 7C:
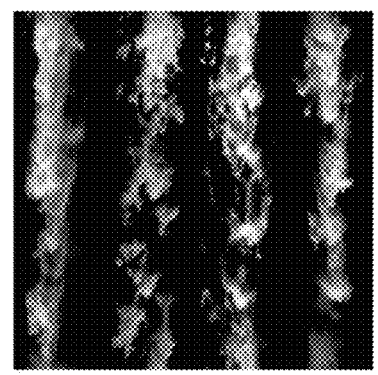

For example, texture groups may be classified into a texture group A including a texture wherein the amount of water is a lot as illustrated in FIG. 7A, a texture group B including a texture wherein the amount of water is median as illustrated in FIG. 7B, and a texture group C including a texture wherein the amount of water is small as illustrated in FIG. 7C. In FIGS. 7A, 7B and 7C, it was illustrated that three texture groups are used, but in actual implementation, there may be two or four or more texture groups. Also, while it was illustrated that four textures are included in each texture group, depending on embodiments, there may be three or fewer, or five or more texture groups.

For example, a display apparatus may multiply a weight a to a texture selected from a texture group A, multiply a weight β to a texture selected from a texture group B, and multiply a weight γ to a texture selected from a texture group C, and then add each texture to which a weight has been multiplied, and acquire an output texture. Here, a texture selected from each texture group may be changed by a random cycle.

Also, here, α+β+γ satisfies 1.0, and at least one of α, β, or γ may have been generated by a perlin noise algorithm. Based on the amount of water displayed on an image, the display apparatus may perform adjustment such that the α value becomes bigger in an area wherein the amount of water is a lot, and the γ value becomes bigger in an area wherein the amount of water is small.

Meanwhile, in FIGS. 7A, 7B and 7C, an embodiment wherein texture groups are classified according to the amounts of water was illustrated, but texture groups may be classified according to the colors of textures. For example, a texture group A may be a group wherein a texture in an R(red) color is included, a texture group B may be a group wherein a texture in a G(green) color is included, and a texture group C may be a group wherein a texture in a B(blue) color is included. A display apparatus may generate an image by mixing textures selected from each group.

Figure 8:
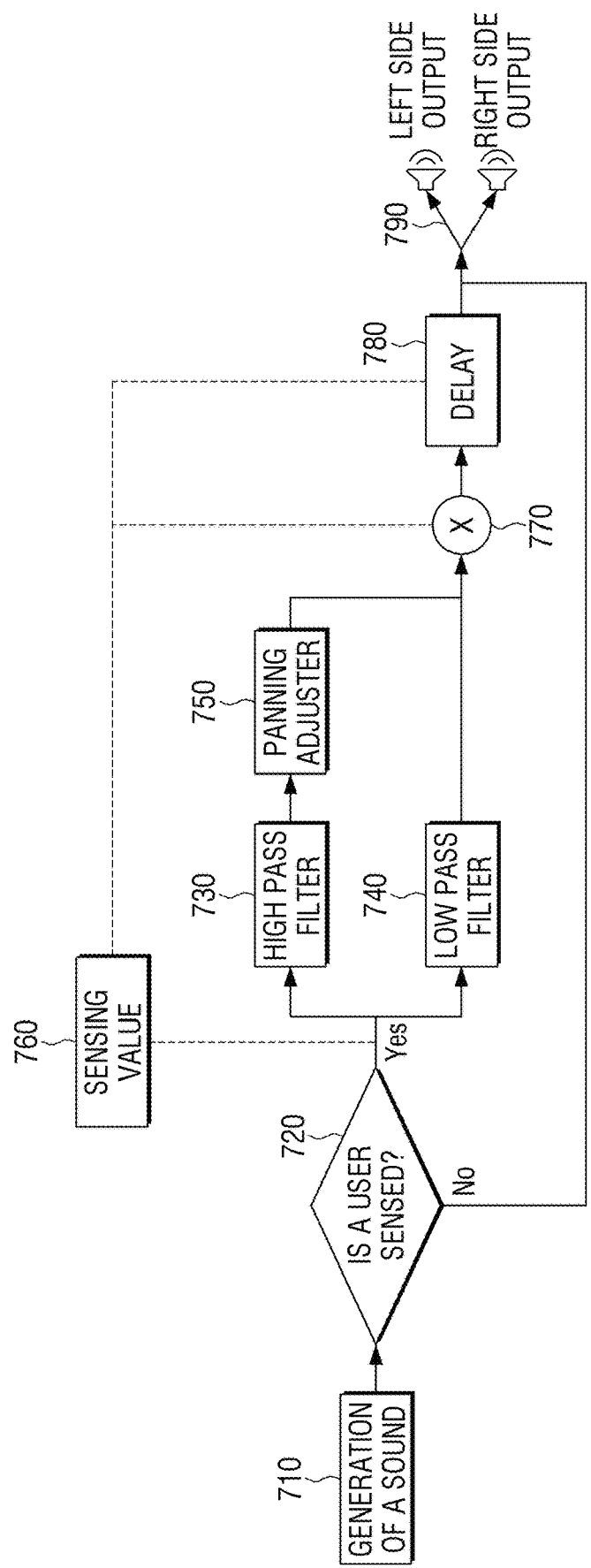
FIG. 8 is a diagram illustrating an example process of changing a sound according to a location of a user according to an embodiment of the disclosure.

FIG. 8 is a diagram illustrating an example process of changing a sound according to a location of a user according to an embodiment of the disclosure.

Referring to FIG. 8, first, a display apparatus may generate a sound corresponding to a background image 710. A sound corresponding to a background image may be a sound of a waterfall, a sound of wind, etc., and may be generated using a noise (a white noise) as illustrated in FIG. 9.

Figure 9:
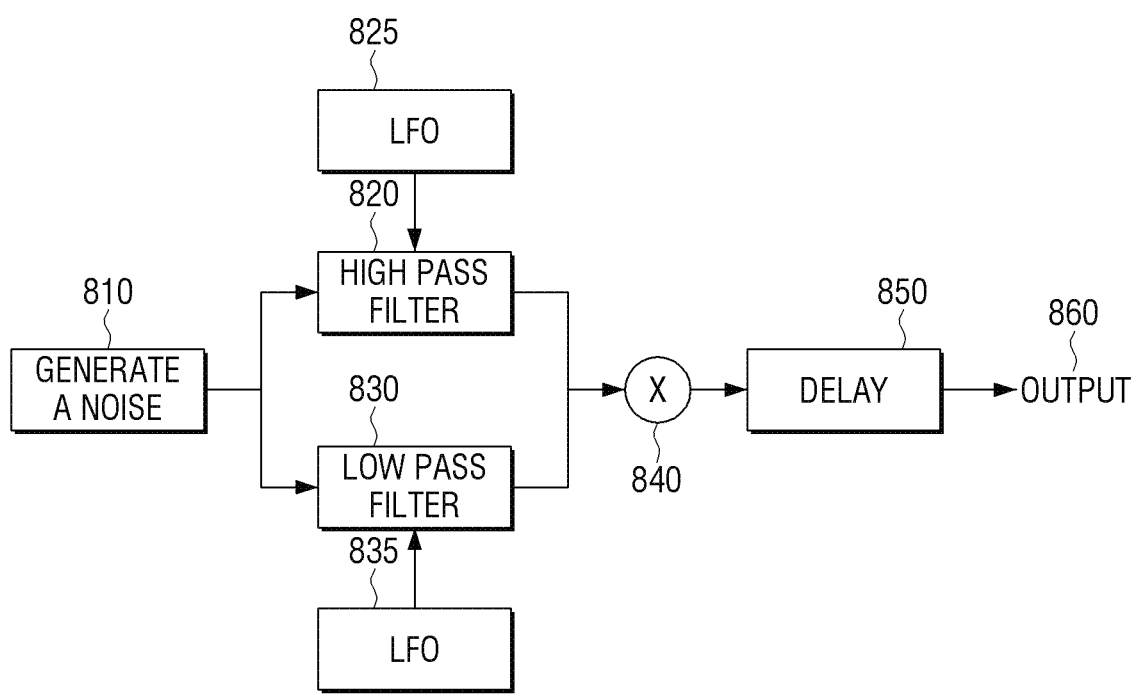
FIG. 9 is a diagram illustrating an example operation of generating a sound in FIG. 8 according to an embodiment of the disclosure.

Referring to FIG. 9, a display apparatus may generate a noise 810, and divide a high band and a low band of the noise using a high pass filter 820 and a low pass filter 830. The display apparatus may apply LFOs 825, 835 to each of the divided high band sound and low band sound. Also, here, an LFO may refer, for example, to an oscillator that generates frequency signals lower than an audible range to humans, and in general, it may oscillate frequencies between 0.1 and 30 Hz.

The applied LFOs 825, 835 may have random cycles. By virtue of this, in case a user hears sounds for a long time period from a far distance, the same sound may not be repeated.

The display apparatus may apply weights to a low band sound and a high band sound to express the height of the waterfall in the background image. For example, the display apparatus may increase the weight of the low band sound as the location wherein the water falls is higher. This is because energy increases as the actual height where water falls is higher, and a lot of low band sounds are generated according to the potential energy generated at the time of collision with the water surface.

In addition, the display apparatus may merge a high band sound and a low band sound to which LFOs are respectively applied 840, and delay the phase of the sound of one of the left side speaker and the right side speaker to express the width of the waterfall 850, and thereby generate a phase difference between the left side speaker and the right side speaker. This is performed using a hearing recognition characteristic of feeling a time phase difference (equal to or smaller than 14 ms) between the left side/right side as a width, and the width of the waterfall may be expressed as a delay between the left side sound and the right side sound.

The display apparatus may output the processed sound 860.

The sound output as described above 860 may correspond to the sound 710 generated in FIG. 8. If a user is sensed 720-Y while the sound 710 generated by the process illustrated in FIG. 9 is being output, the display apparatus may divide the sound into a high band sound and a low band sound using the high pass filter 730 and the low pass filter 740.

The display apparatus may adjust panning of the divided high band sound using a panning adjuster 750. The display apparatus may adjust panning of the high band sound based on a sensing value 760. The sensing value 760 may refer, for example, to the location of the user.

The display apparatus may merge the high band sound of which panning has been adjusted and the low band sound 770. The display apparatus may apply the weights of the high band sound and the low band sound using the sensing value 760. For example, in case the location of the user determined based on the sensing value 760 is the center of the display, or its distance from the display is close, the display apparatus may increase the weight of the low band sound, and decrease the weight of the high band sound, and merge the sounds.

The display apparatus may delay the sounds to be output from the left side speaker and the right side speaker based on the sensing value 760, and thereby generate a time phase difference. For example, in case the location of the user determined based on the sensing value 760 is a side area of the display, the display apparatus may delay one of the sounds output through the left side speaker and the right side speaker, and thereby generate a time phase difference between the left side sound and the right side sound.

The display apparatus may output the left side sound and the right side sound for which a phase difference was generated 790.

If the location of the user is the center area of the display, the display apparatus may output the sounds such that the phase difference between the left side sound and the right side sound is the same without a delay.

If a user is not sensed 720-N while the sound 710 generated by the process illustrated in FIG. 9 is being output, the display apparatus may output the generated sound 710 as it is 790.

FIGS. 11A, 11B, 12A and 12B are diagrams illustrating examples of different outputting of sounds according to locations of a user. In the center area of the display apparatus 100, a waterfall image having a big width may be displayed.

Figure 11A:
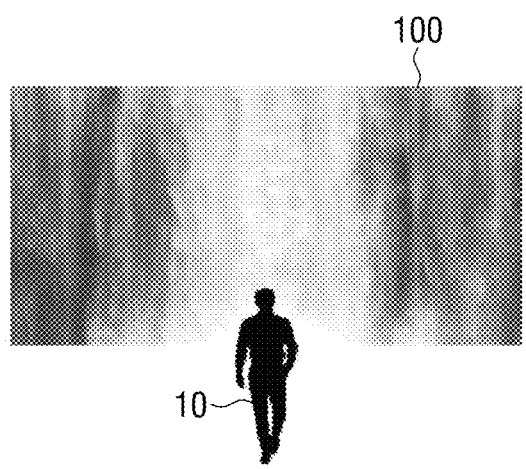
FIGS. 11A and 11B are diagrams illustrating different examples of outputting sounds according to locations of a user according to an embodiment of the disclosure.
Figure 11B:

For example, FIG. 11A illustrates an example wherein the user 10 is located in the center area of the display apparatus 100, and FIG. 11B illustrates an example wherein the user 10 is located in the side area of the display apparatus 100.

As illustrated in FIG. 11A, in case the user 10 is located in the center area of the display apparatus 100, the display apparatus may divide the waterfall sound into a high band sound and a low band sound, and output a sound wherein the weight of the low band sound has been increased, and the weight of the high band sound has been decreased.

As illustrated in FIG. 11B, in case the user 10 is located in the side area of the display apparatus 100, the display apparatus may divide the waterfall sound into a high band sound and a low band sound, and output a sound wherein the weight of the high band sound has been increased, and the weight of the low band sound has been decreased.

Based on this, the user 10 may hear different sounds according to the locations in front of the display apparatus 100, and accordingly, the user 10 may feel a sense of realism as if an actual waterfall is located in the front.

Figure 12A:
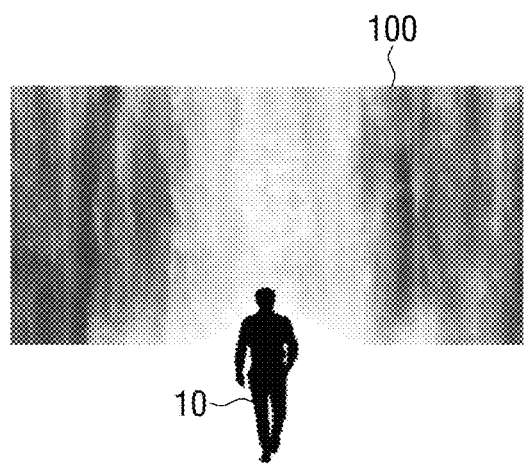
FIGS. 12A and 12B are diagrams illustrating different examples of outputting sounds according to locations of a user according to an embodiment of the disclosure.
Figure 12B:
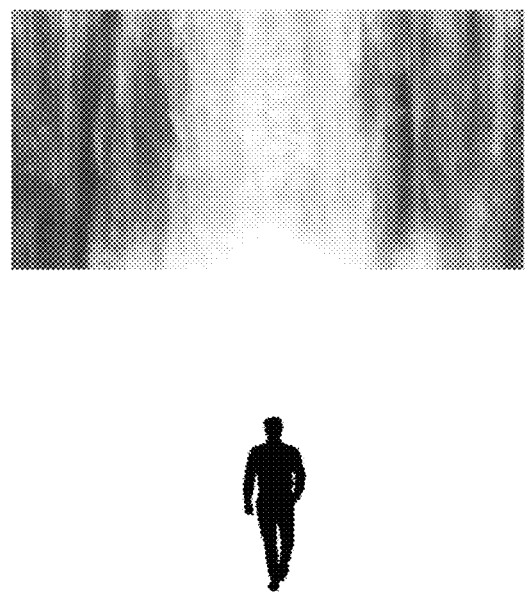

FIG. 12A illustrates an example wherein the user 10 is located at a close distance from the display apparatus 100, and FIG. 12B illustrates an example wherein the user 10 is located at a far distance from the display apparatus 100.

As illustrated in FIG. 12A, in case the user 10 is located at a close distance from the display apparatus 100, the display apparatus may divide the waterfall sound into a high band sound and a low band sound, and output a sound wherein the weight of the low band sound has been increased, and the weight of the high band sound has been decreased.

As illustrated in FIG. 12B, in case the user 10 is located at a far distance from the display apparatus 100, the display apparatus may divide the waterfall sound into a high band sound and a low band sound, and output a sound wherein the weight of the high band sound has been increased, and the weight of the low band sound has been decreased.

Based on this, the user 10 may hear different sounds according to the distances from the display apparatus 100, and accordingly, the user 10 may feel a sense of realism as if an actual waterfall is located in the front.

FIGS. 13A, 13B, 13C, 14A, 14B, 14C, 15A, 15B and 15C are diagrams illustrating examples of different adjustment of volumes of sounds according to locations of a user. The display apparatus 100 may include a left side speaker 120-1 and a right side speaker 120-2, based on the direction of the gaze of the user 10.

Figures 13A, 13B, 13C:
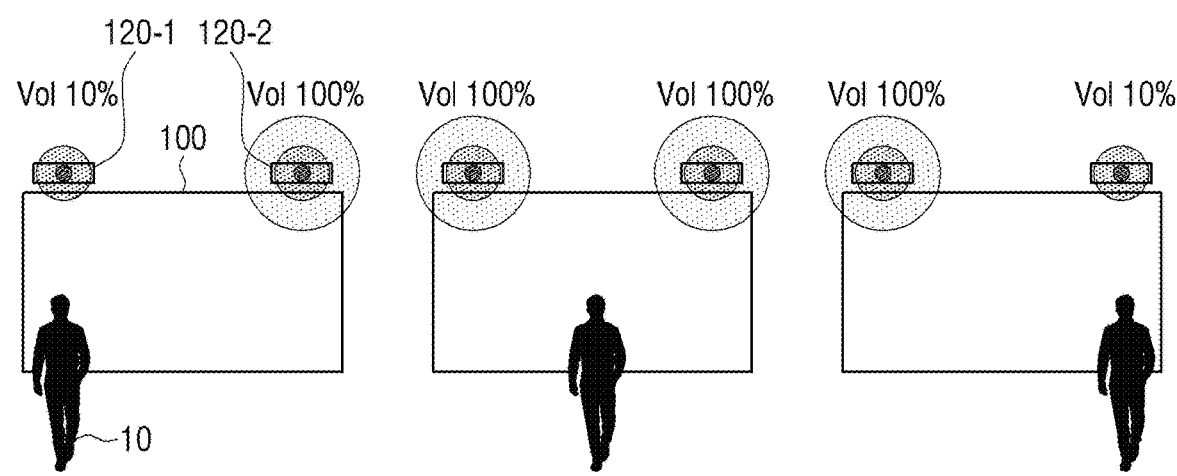
FIGS. 13A, 13B and 13C are diagrams illustrating examples of different adjustment of volumes of sounds according to locations of a user according to an embodiment of the disclosure.

FIG. 13A illustrates an example wherein the user 10 is located in the left side area of the display apparatus 100, FIG. 13B illustrates an example wherein the user 10 is located in the center area of the display apparatus 100, and FIG. 13C illustrates an example wherein the user 10 is located in the right side area of the display apparatus 100.

Referring to FIG. 13A, in case the user 10 is located in the left side area of the display apparatus 100, the left side speaker 120-1 may output a sound in a small volume, and the right side speaker 120-2 may output a sound in a big volume.

Also, referring to FIG. 13B, in case the user 10 is located in the center area of the display apparatus 100, the left side speaker 120-1 and the right side speaker 120-2 may output sounds in volumes in the same size.

Referring to FIG. 13C, in case the user 10 is located in the right side area of the display apparatus 100, the left side speaker 120-1 may output a sound in a big volume, and the right side speaker 120-2 may output a sound in a small volume.

This is for providing hearing experiences in the same volume regardless of the location of the user 10, and although the volumes that the user hears may be the same, a phase difference between the left side speaker and the right side speaker, and a weight of a low band sound and a weight of a high band sound according to the location of the user may be different, as described above.

Figures 14A, 14B, 14C:
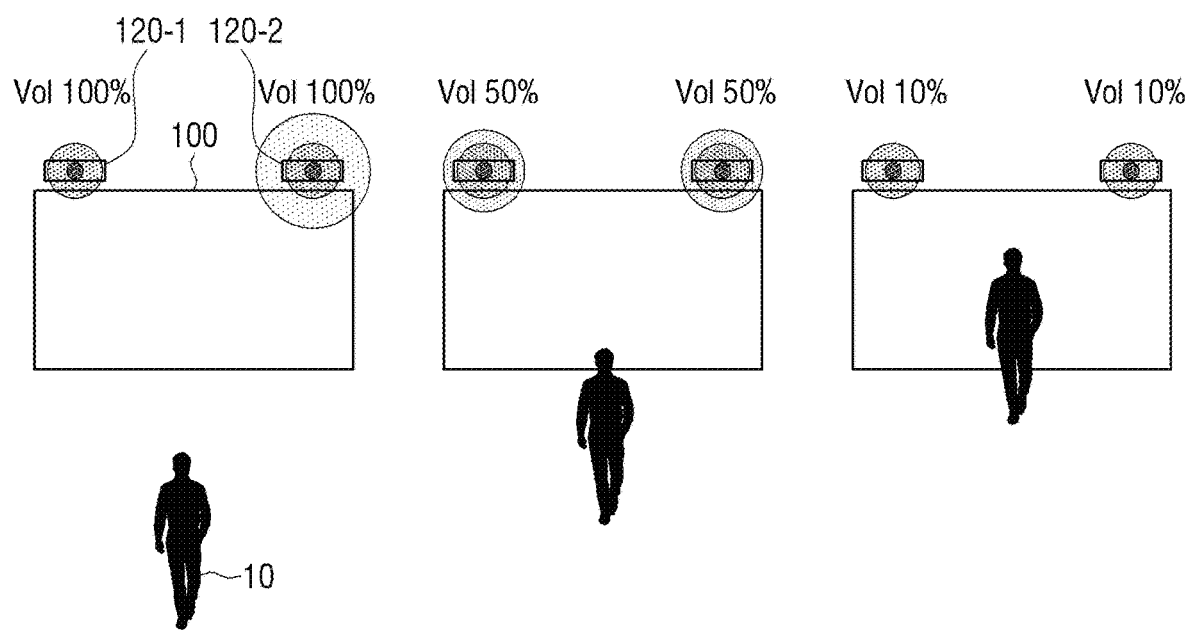
FIGS. 14A, 14B and 14C are diagrams illustrating examples of different adjustment of volumes of sounds according to locations of a user according to an embodiment of the disclosure.

FIG. 14A illustrates an example wherein the user 10 is located at a far distance from the display apparatus 100, FIG. 14B illustrates an example wherein the user 10 is located at a median distance from the display apparatus 100, and FIG. 14C illustrates an example wherein the user 10 is located at a close distance from the display apparatus 100. Based on the assumption that the user 10 is located in the center area of the display apparatus 100, the sizes of the volumes of the left side speaker and the right side speaker 120-1, 120-2 may be the same.

Referring to FIG. 14A, in case the user 10 is located at a far distance from the display apparatus 100, the left side speaker 120-1 and the right side speaker 120-2 may output sounds in big volumes.

Referring to FIG. 14B, in case the user 10 is located at a median distance from the display apparatus 100, the left side speaker 120-1 and the right side speaker 120-2 may output sounds in median volumes.

Referring to FIG. 14C, in case the user 10 is located at a close distance from the display apparatus 100, the left side speaker 120-1 and the right side speaker 120-2 may output sounds in small volumes.

This is for providing hearing experiences in the same volume regardless of the location of the user 10, and although the volumes that the user hears may be the same, a weight of a low band sound and a weight of a high band sound may be different, as described above.

Figures 15A, 15B, 15C:
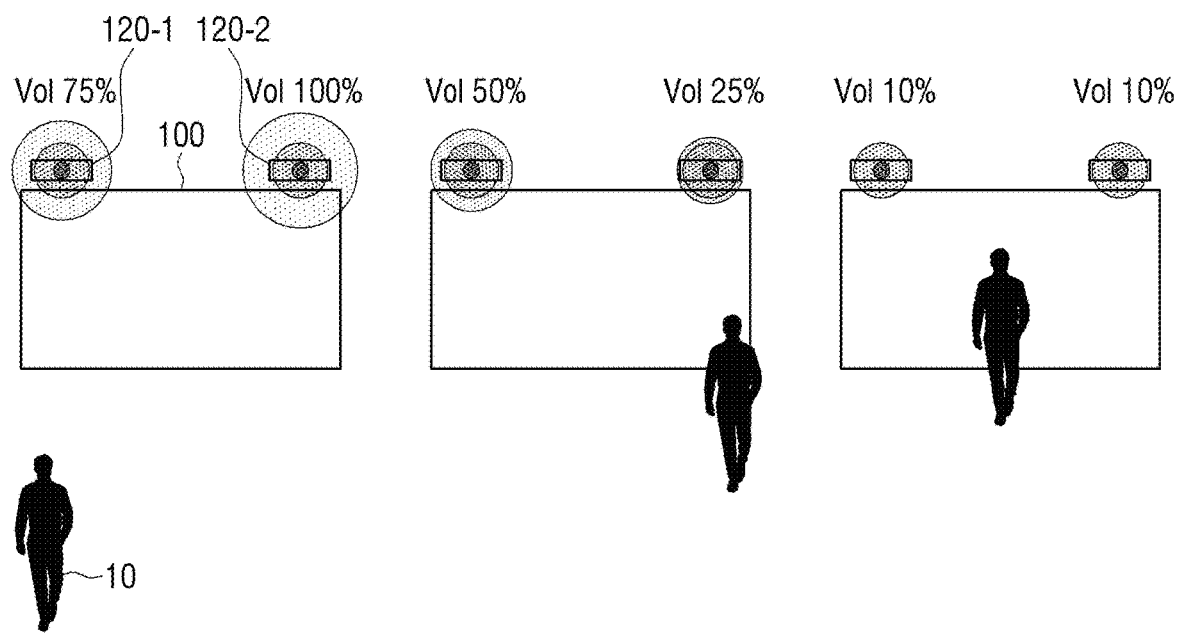
FIGS. 15A, 15B and 15C are diagrams illustrating examples of different adjustment of volumes of sounds according to locations of a user according to an embodiment of the disclosure.

FIGS. 15A, 15B and 15C illustrate an example wherein the embodiments of both of FIGS. 13 and 14 are applied, and FIG. 15A illustrates an example wherein the user 10 is located in the left side area of the display apparatus 100 and at a far distance, FIG. 15B illustrates an example wherein the user 10 is located in the right side area of the display apparatus 100 and at a median distance, and FIG. 15C illustrates an example wherein the user 10 is located in the center area of the display apparatus 100 and at a close distance.

Referring to FIG. 15A, in case the user 10 is located in the left side area of the display apparatus 100 and at a far distance, both of the left side speaker 120-1 and the right side speaker 120-2 output sounds in big volumes, but the right side speaker 120-2 may output a sound in a bigger volume than the left side speaker 120-1.

Referring to FIG. 15B, in case the user 10 is located in the right side area of the display apparatus 100 and at a median distance, both of the left side speaker 120-1 and the right side speaker 120-2 output sounds in median volumes, but the left side speaker 120-1 may output a sound in a bigger volume than the right side speaker 120-2.

Referring to FIG. 15C, in case the user 10 is located in the center area of the display apparatus 100 and at a close distance, both of the left side speaker 120-1 and the right side speaker 120-2 may output sounds in small volumes in the same size.

This is for providing hearing experiences in the same volume regardless of the location of the user 10, and although the volumes that the user hears may be the same, a phase difference between the left side speaker and the right side speaker, and a weight of a low band sound and a weight of a high band sound according to the location of the user may be different, as described above.

The sound volumes illustrated in FIGS. 13 to 15 are merely embodiments, and the disclosure is not limited thereto.

Figures 16A, 16B, 16C:
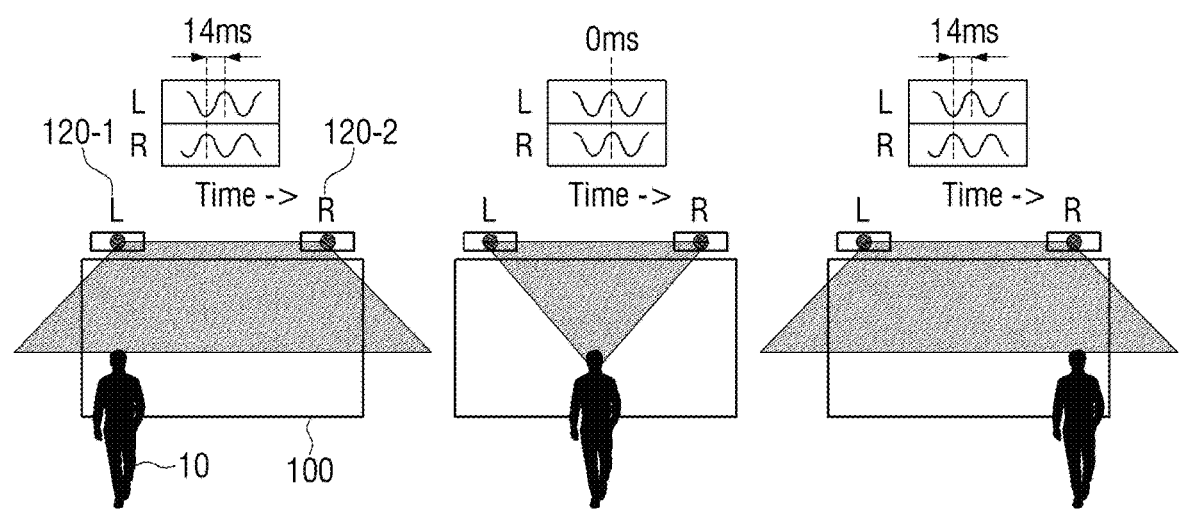
FIGS. 16A, 16B and 16C are diagrams illustrating examples of different adjustment of phases of sounds according to locations of a user according to an embodiment of the disclosure.

FIGS. 16A, 16B and 16C are diagrams illustrating examples of different adjustment of phases of sounds according to locations of a user. The display apparatus 100 may include a left side speaker 120-1 (L) and a right side speaker 120-2 (R), based on the direction of the gaze of the user 10. The shadow area in FIGS. 16A, 16B and 16C may refer, for example, to the width of the sound that is felt by the user 10.

FIG. 16A illustrates an example wherein the user 10 is located in the left side area of the display apparatus 100, FIG. 16B illustrates an example wherein the user is 10 is located in the center area of the display apparatus 100, and FIG. 16C illustrates an example wherein the user 10 is located in the right side area of the display apparatus 100.

Referring to FIG. 16A, in case the user 10 is located in the left side area of the display apparatus 100, the left side speaker 120-1 and the right side speaker 120-2 may output sounds of different phases. For example, the display apparatus 100 may delay at least one of the sound of the left side speaker 120-1 or the sound of the right side speaker 120-2 such that the phase difference between the sound output from the left side speaker 120-1 and the sound output from the right side speaker 120-2 is equal to or smaller than 14 ms, and output the sound.

This is also the same as or similar to a case wherein the user 10 is located in the right side area of the display apparatus 100 as in FIG. 16C.

As illustrated in FIG. 16B, in case the user 10 is located in the center area of the display apparatus 100, the display apparatus may output the sound of the left side speaker 120-1 and the sound of the right side speaker 120-2 such that the sounds have the same phases.

As described above, in case the user 10 exists on both sides of the display apparatus 100, there may be a distanced sense of space as a time phase difference between the left side sound/the right side sound is provided, and in case the user 10 is located in the center area of the display apparatus 100, a time phase difference is not provided, and thus a more enlarged sense of space may be felt.

Figures 17A, 17B:
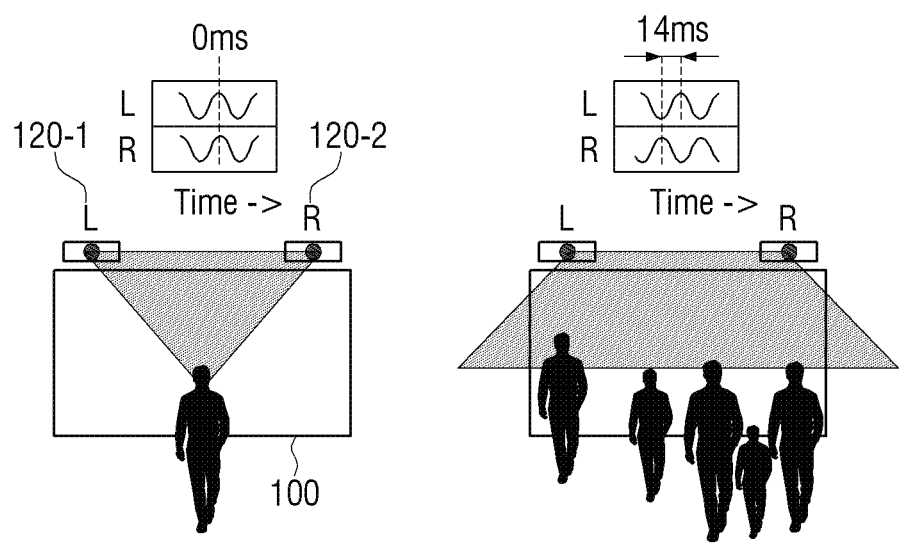
FIGS. 17A and 17B are diagrams illustrating examples of different adjustment of phases of sounds according to the number of users according to an embodiment of the disclosure.

FIGS. 17A and 17B are diagrams illustrating examples of different adjustment of phases of sounds according to the number of users.

As illustrated in FIG. 17A, if a user 10 is located in the center area of the display apparatus 100, the display apparatus 100 may not provide a phase difference between the sound of the left side speaker 120-1 and the sound of the right side speaker 120-2.

On the other hand, as illustrated in FIG. 17B, in case a plurality of users are located in several areas of the display apparatus 100, the display apparatus 100 may delay at least one of the sound of the left side speaker 120-1 or the sound of the right side speaker 120-2 such that the phase difference between the sound output from the left side speaker 120-1 and the sound output from the right side speaker 120-2 is equal to or smaller than 14 ms, and output the sound. By virtue of this, a plurality of users may feel a more enlarged sense of space.

The time phase differences illustrated in FIGS. 16 and 17 are merely examples, and the disclosure is not limited thereto.

Figures 18A, 18B, 18C:
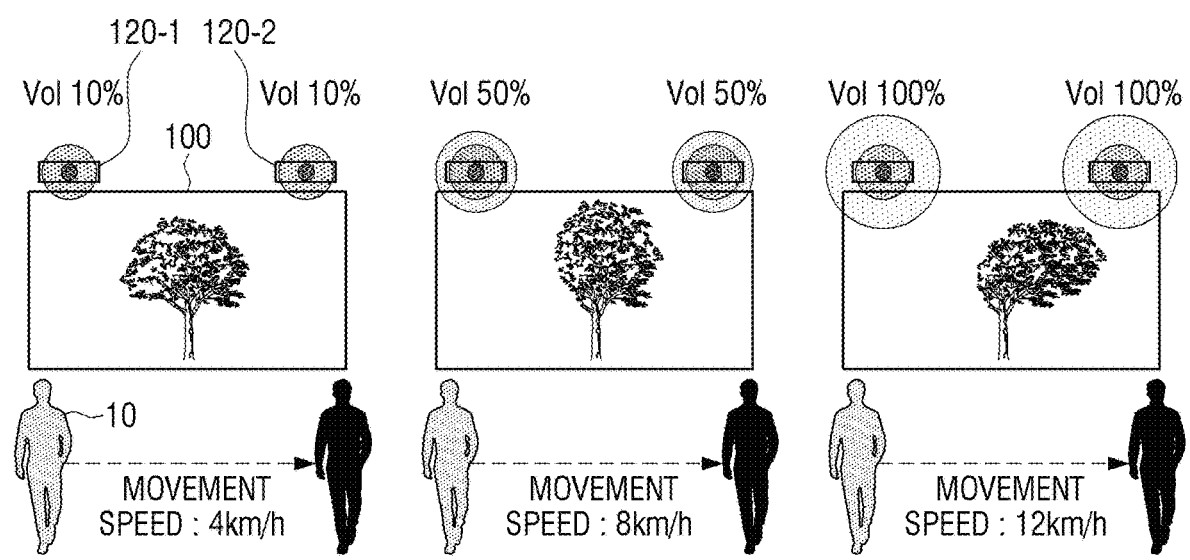
FIGS. 18A, 18B and 18C are diagrams illustrating examples of image effects and outputting of sounds according to movement speeds of a user according to an embodiment of the disclosure.

FIGS. 18A, 18B and 18C are diagrams illustrating examples of image effects and outputting of sounds according to movement speeds of a user. For example, the display apparatus 100 may sense movement of locations and movement speeds of a user using a sensor, and provide different image effects and sounds based on the sensed movement speeds.

FIG. 18A illustrates an example wherein the movement speed of the user 10 is 4 km/h, FIG. 18B illustrates an example wherein the movement speed of the user 10 is 8 km/h, and FIG. 18C illustrates an example wherein the movement speed of the user 10 is 12 km/h.

As illustrated in FIG. 18A, in case the movement speed of the user 10 is 4 km/h, the display apparatus 100 may provide an image effect that weak wind blows. As the display apparatus 100 provides an image effect that weak wind blows, the display apparatus 100 may control the left side speaker and the right side speaker 120-1, 120-2 such that a weak wind sound is provided.

As illustrated in FIG. 18B, in case the movement speed of the user 10 is 8 km/h, the display apparatus 100 may provide an image effect that median wind blows. As the display apparatus 100 provides an image effect that median wind blows, the display apparatus 100 may control the left side speaker and the right side speaker 120-1, 120-2 such that a wind sound having a bigger volume than in FIG. 18A is provided.

As illustrated in FIG. 18, in case the movement speed of the user 10 is 12 km/h, the display apparatus 100 may provide an image effect that strong wind blows. As the display apparatus 100 provides an image effect that strong wind blows, the display apparatus 100 may control the left side speaker and the right side speaker 120-1, 120-2 such that a wind sound having a bigger volume than in FIG. 18B is provided.

In FIGS. 18A, 18B and 18C, it was illustrated that an image effect is provided to a background image including a tree, but the same image effect and sound may be provided to various background images such as a cloud and a pinwheel. As an image effect as if wind blows according to a location of a user is provided, an image effect that shadows of a tree, a pinwheel, etc. included in a background image sway according to the movement speed of a user may also be provided.

As described above, as image effects and sounds according to user interactions are provided, a user may be provided with experiences with a better sense of realism.

Figure 19A:
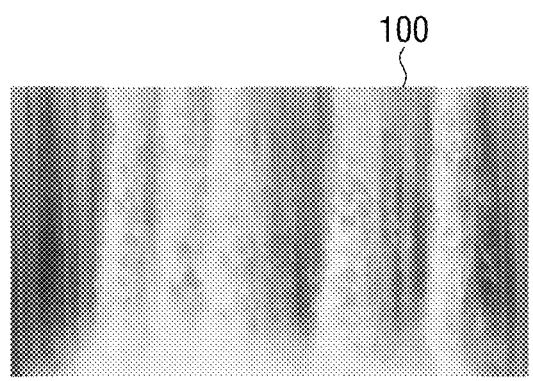
FIGS. 19A and 19B are diagrams illustrating an example image effect that is changed according to whether a user is sensed according to an embodiment of the disclosure.
Figure 19B:
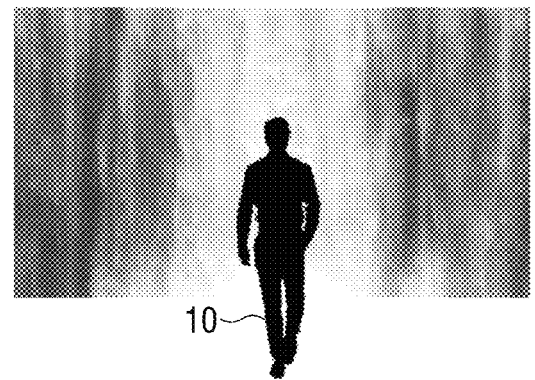

FIGS. 19A and 19B are diagrams illustrating an example of image effect that is changed according to whether a user is sensed.

For example, FIG. 19A illustrates a background image that is provided in case a user is not sensed. The display apparatus 100 may apply a random element to a location wherein a user was sensed for the last time, and output a background image and a sound corresponding thereto.

For example, in case a background image is an image related to a waterfall, the display apparatus 100 may display a plurality of waterfall streams having thin widths over the entire display area. As illustrated in FIG. 9, the display apparatus 100 may generate a waterfall sound using a noise, and prevent and/or reduce repetition of the same sound using LFO signals of a random cycle, such that the sound is closer to a natural phenomenon.

In a state as illustrated in FIG. 19A, if the user 10 is sensed, and the user 10 maintains a location during a predetermined time period, the display apparatus 100 may provide an image effect as illustrated in FIG. 19B.

For example, if a background image is an image related to a waterfall, the display apparatus 100 may provide an image effect that a width of a waterfall stream increases in a display area corresponding to a location wherein the user is sensed. As the width of the waterfall stream increases, the display apparatus 100 may increase the weight of the low band sound and output the sound. The display apparatus 100 may increase the amount of a rain fog generated in the lower end area of the display.

As described above, image effects and sounds are provided in real time according to locations of a user, and accordingly, a user may feel a sense of realism as if an actual waterfall is located in the front.

Figure 23:
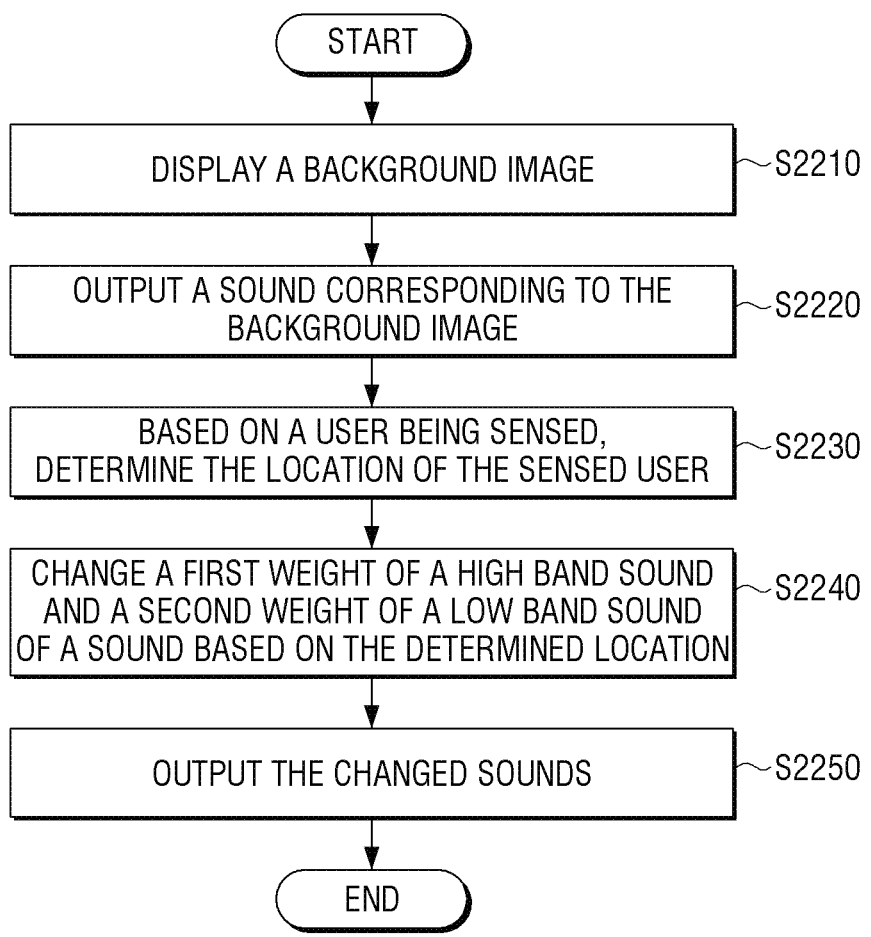
FIG. 23 is a flowchart illustrating an example method of controlling a display apparatus according to an embodiment of the disclosure.

FIG. 23 is a flowchart illustrating an example method of controlling a display apparatus according to an embodiment of the disclosure.

Referring to FIG. 23, the display apparatus may display a background image at operation 52210. A background image may be a nature background image such as a waterfall, a tree, and a cloud or an artificial background image such as a fountain. The display apparatus may output a sound corresponding to the background image at operation 52220. For example, a sound corresponding to the background image may be a water sound such as a waterfall, a wind sound, etc., and the display apparatus may output the generated sound by using LFO signals of a random cycle to a white noise.

When a user is sensed, the display apparatus may determine the location of the sensed user at operation 52230. Specifically, the display apparatus may determine the location of the user by using at least one sensor installed. For example, the display apparatus may divide the display into a plurality of vertical areas, identify an area wherein the user was sensed among the plurality of vertical areas by using a sensor, and determine the location of the user by using the identified area and the distance from the user.

The display apparatus may change the first weight of the high band sound and the second weight of the low band sound of the sound based on the determined location of the user at operation 52240. For example, the display apparatus may divide the sound corresponding to the background image into a high band sound and a low band sound using a high pass filter and a low pass filter. The display apparatus may adjust the first weight of the high band sound and the second weight of the low band sound according to the location of the user. For example, if the user is located in the center area of the display or at a close distance, the display apparatus may increase the second weight of the low band sound, and decrease the first weight of the high band sound.

The display apparatus may adjust panning of the high band sound according to the location of the user, or may perform control such that the sounds output from the left side speaker and the right side speaker have a phase difference.

The display apparatus may output the changed sounds at operation 52250.

As in the various embodiments described above, different image effects and sounds are provided according to locations of a user and user interactions, and thus a user may feel a sense of realism which is more similar to the reality.

The various embodiments described above may be implemented in recording media readable by a computer or an apparatus similar to a computer using software, hardware or a combination thereof. According to implementation by hardware, the embodiments described in the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, an electronic unit, or the like for performing various functions. In some cases, the embodiments described in this disclosure may be implemented as a processor itself. Meanwhile, according to implementation by software, the embodiments such as procedures and functions described in this disclosure may be implemented as separate software modules. Each of the software modules may perform one or more functions and operations described in this specification.

Methods according to the aforementioned various embodiments of the disclosure may be stored in non-transitory readable media. Such non-transitory readable media may be used while being installed on various apparatuses.

A non-transitory readable medium may refer, for example, to a medium that stores data semi-permanently, and is readable by machines. For example, programs for performing the aforementioned various methods may be provided while being stored in non-transitory readable media such as, for example, and without limitation, a CD, a DVD, a hard disc, a blue-ray disc, a USB, a memory card, a ROM, or the like.

According to an embodiment of the disclosure, methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., PlayStore™). In the case of on-line distribution, at least a portion of a computer program product may be stored in a storage medium such as the server of the manufacturer, the server of the application store, and the memory of the relay server at least temporarily, or may be generated temporarily.

While various example embodiments of the disclosure have been illustrated and described, it will be understood that the disclosure is not limited to the aforementioned embodiments, and it will be apparent that various modifications can be made by those having ordinary skill in the technical field to which the disclosure belongs, without departing from the true spirit and full scope of the disclosure.

What is claimed is:

1. A display apparatus comprising:
a display;
a plurality of speakers;
a sensor;
a communicator comprising communication circuitry; and
a processor configured to control the display apparatus to:
control the display to display an image,
generate a sound corresponding to the image and output the sound through the plurality of speakers,
determine a location of a sensed user based on the user being sensed by the sensor,
receive weather information through the communicator, and
change a first weight of a high band sound and a second weight of a low band sound of the sound, and output the changed sounds through the plurality of speakers based on the determined location of the user and the received weather information.

2. The display apparatus of claim 1,
wherein the sound is generated by merging the high band sound and the low band sound.

3. The display apparatus of claim 1,
wherein the processor is configured to control the display apparatus to:
decrease the first weight of the high band sound and increase the second weight of the low band sound based on the determined location of the user being toward the center of the display.

4. The display apparatus of claim 1,
wherein the processor is configured to control the display apparatus to:
increase the first weight of the high band sound and decrease the second weight of the low band sound based on a distance between the determined location of the user and the display increasing.

5. The display apparatus of claim 1,
wherein the processor is configured to control the display apparatus to:
control the display to provide an image effect to an area corresponding to the determined location of the user in the image.

6. The display apparatus of claim 1,
wherein the processor is configured to control the display apparatus to:
adjust panning of the high band sound based on the determined location of the user, and
output the low band sound and the adjusted high band sound through the plurality of speakers.

7. The display apparatus of claim 1,
wherein the plurality of speakers include a left side speaker and a right side speaker, and
the processor is configured to control the display apparatus to:
output a sound through the right side speaker having a phase different from a phase of a sound output through the left side speaker based on the determined location of the user being a side of the display.

8. The display apparatus of claim 1,
wherein the processor is configured to control the display apparatus to:
increase the second weight of the low band sound based on the weather information including rain information, distribute the low band sound, and output the sound through the plurality of speakers.

9. The display apparatus of claim 1,
wherein the processor is configured to control the display apparatus to:
output a sound having an increased volume through the plurality of speakers based on a distance between the determined location of the user and the display increasing.

10. The display apparatus of claim 1,
wherein the plurality of speakers include a left side speaker and a right side speaker, and
the processor is configured to control the display apparatus to:
adjust volumes of the left side speaker and the right side speaker based on an amount of movement based on the determined location of the user moving inside the area of the display.

11. The display apparatus of claim 1,
wherein the processor is configured to control the display apparatus to:
divide the display into a plurality of vertical areas, and
determine a location of a user based on an area in which a user is sensed by the sensor among the plurality of vertical areas and based on a distance between the display and the user.

12. The display apparatus of claim 1,
wherein the processor is configured to control the display apparatus to:
apply low frequency oscillator (LFO) signals of a random cycle to each of a high band sound and a low band sound of a sound corresponding to the image based on a user not being sensed by the sensor, and output the sounds through the plurality of speakers.

13. The display apparatus of claim 1,
wherein the image includes an image related to a waterfall, and
the processor is configured to control the display apparatus to:
control the display based on the weather information, to provide a prism effect and/or an illumination effect based on the weather information and time information.

14. The display apparatus of claim 1,
wherein the image includes an image related to a waterfall, and
the processor is configured to control the display apparatus to:
control the display based on the determined location of the user being maintained during a predetermined time period to provide an image effect that a width of a waterfall stream in the area of the display corresponding to the location of the user is increased.

15. The display apparatus of claim 1,
wherein the image includes an image related to a waterfall, and
the processor is configured to control the display apparatus to:
adjust an amount of fog displayed in a lower end area of the display based on a width of a waterfall stream.

16. A method of controlling a display apparatus comprising:
displaying an image;
generating a sound corresponding to the image and outputting the sound through the plurality of speakers;
determining a location of a user based on the user being sensed;
receive weather information;
changing a first weight of a high band sound and a second weight of a low band sound of the sound based on the determined location of the user and the received weather information; and
outputting the changed sounds through the plurality of speakers.

17. The method of controlling a display apparatus of claim 16,
wherein the changing comprises:
decreasing the first weight of the high band sound and increasing the second weight of the low band sound based on the determined location of the user being toward a center of the display.

18. The method of controlling a display apparatus of claim 16,
wherein the changing comprises:
increasing the first weight of the high band sound and decreasing the second weight of the low band sound based on a distance between the determined location of the user and the display increasing.

19. The method of controlling a display apparatus of claim 16,
wherein the plurality of speakers include a left side speaker and a right side speaker, and
the outputting comprises:
outputting a sound through the right side speaker having a phase different from a phase of a sound output through the left side speaker based on the determined location of the user being a side of the display.

20. The method of controlling a display apparatus of claim 16,
wherein the outputting comprises:
applying low frequency oscillator (LFO) signals of a random cycle to each of a high band sound and a low band sound of a sound corresponding to the image based on a user sensed not being sensed, and outputting the sounds through the plurality of speakers.

* * * * *